United States Patent [19]

Turner

[11] Patent Number: 4,701,475
[45] Date of Patent: Oct. 20, 1987

[54] POLYURETHANES REINFORCED WITH RIGID ROD MICRO FILLERS

[75] Inventor: Robert B. Turner, Lake Jackson, Tex.

[73] Assignee: The Dow Chemical Company, Midland, Mich.

[21] Appl. No.: 878,451

[22] Filed: Jun. 25, 1986

[51] Int. Cl.$^4$ ............................................. C08G 18/14
[52] U.S. Cl. ................................... 521/137; 524/191; 524/377; 525/123; 525/452; 525/453
[58] Field of Search ................. 521/137; 524/291, 377; 525/123, 452, 453

[56] References Cited

U.S. PATENT DOCUMENTS 4,102,831  7/1978  Osgood ............................. 521/137

Primary Examiner—Maurice J. Welsh

[57] ABSTRACT

In one aspect, this invention is a polyurethane polymer having dispersed therein elongated particles of a high-melting, rigid polymer in an amount sufficient to measurably increase the tensile strength and/or elongation of the polyurethane relative to a like polyurethane which is prepared in the absence of said elongated particles.

In another aspect, this invention is an active hydrogen-containing composition comprising at least one active hydrogen-containing compound having dispersed therein elongated particles of a high-melting rigid polymer in an amount which provides reinforcement to a polyurethane polymer prepared by reacting said active hydrogen-containing composition with a polyisocyanate.

17 Claims, No Drawings

POLYURETHANES REINFORCED WITH RIGID ROD MICRO FILLERS

BACKGROUND OF THE INVENTION

This invention relates to polyurethane polymers, particularly polyurethane polymers containing dispersed reinforcing agents.

It is well known to reinforce polyurethane polymers with macroscopic fillers such as glass, polyamide, polyester, graphite or similar fibers; particulate fillers such as calcium carbonate, barium sulfate and the like, and other fillers such as sand, and milled or flaked glass. Although these fillers are known to improve the properties of the polyurethane, they have several drawbacks. One is the amount of such fillers which are needed to obtain good reinforcement. Typically, up to about 60 percent or more of the filled polymer comprises the filler material. It would be highly desirable to obtain good reinforcement at lower levels of filler. Another problem is that many of these filler materials do not strongly adhere to the polyurethane matrix. Accordingly, the reinforcement is not as great as would be expected. Another problem is that although certain properties such as stiffness and tensile strength are improved by the use of these fillers, these improvements are usually accompanied by a substantial decrease in other properties, notably impact strength, fatigue and elongation.

It is also known to reinforce a polyurethane polymer by using a polyol containing colloidally dispersed polymer particles. These so-called "polymer polyols" generally contain as the dispersed polymer a styrene/acrylonitrile copolymer, a polyurea polymer or a polyurethaneurea polymer. The dispersed polymers are usually prepared in situ by polymerizing the appropriate monomers within the polyol. The reinforced polyurethane is prepared by reacting the dispersion with a polyisocyanate. The use of polymer polyols has not been found to significantly increase properties such as tensile strength or flexural modulus. The major use for these products has been in flexible polyurethane foams, where the dispersed particles increase the load bearing properties of the foam, and perform a cell opening function.

It would be desirable to provide a reinforced polyurethane in which good reinforcement is obtained even at relatively low filler levels and in which desirable improvements in physical properties are achieved without major losses in other properties.

SUMMARY OF THE INVENTION

In one aspect, this invention is a polyurethane polymer having microscopically dispersed therein elongated particles of a high-melting, rigid polymer in an amount sufficient to measurably increase the tensile strength and/or elongation of the polyurethane relative to a like polyurethane which is prepared in the absence of said elongated particles.

In another aspect, this invention is an active hydrogen-containing composition comprising at least one active hydrogen-containing compound having dispersed therein elongated particles of a high-melting rigid polymer in an amount which provides reinforcement to a polyurethane polymer prepared by reacting said active hydrogen-containing composition with a polyisocyanate.

Applicants have found that by using as a filler material microscopically dispersed, elongated particles of a rigid polymer, very substantial improvements in physical properties, particularly tensile properties can be achieved at surprisingly low loadings.

DETAILED DESCRIPTION OF THE INVENTION

The filler material employed in this invention is an elongated particle of a rigid polymer. Said particle is characterized by having an aspect ratio (ratio of length to diameter) of significantly greater than 1. Preferably, the elongated particle has an aspect ratio of greater than about 4, more preferably at least about 6.4. Said particle is also advantageously small in size, preferably being colloidally dispersed in the polyurethane. Most preferably, said particle has an average length of less than about 10 microns, especially less than about 2 microns, and an average diameter such that it has an aspect ratio of at least about 6.4.

In addition to the required elongated shape, the polymer must be of a composition such that it is relatively rigid. By relatively rigid, it is meant that the rigid polymer exhibits a flexural modulus, in bulk, which is substantially (at least 1.5 times) greater than that of the polyurethane matrix in which it is dispersed. Preferably, the rigid polymer is one which in bulk exhibits a flexural modulus of greater than about 100,000 psi, more preferably greater than about 300,000 psi, most preferably greater than about 500,000 psi. Various substantially linear polymers are known to exhibit the required rigidity, and any of those are useful herein. The rigid polymer must also be high melting, i.e. have a melting point in excess of 100°, preferably about 150° C. Particularly suitable are polymers containing a plurality of aromatic rings which are joined by relatively inflexible or short linkages such as a covalent bond or urea, amide, ester, —C=C—, —CH$_2$—, —C=N—, or like group.

A particularly useful rigid polymer is a polyurea which is reaction product of an aromatic diamine and an aromatic diisocyanate. Particularly suitable aromatic diamines are those in which the aromatic ring is para-substituted such as p-phenylene diamine and 4,4'-methylene dianiline. Particularly suitable aromatic diisocyanates are also para-substituted, such as p-phenylenediisocyanate and 4,4'-diphenylmethanediisocyanate. An especially preferred rigid polymer is a the reaction product of 4,4'-methylene dianiline and 4,4'-diphenylmethanediisocyanate.

The rigid polymer is advantageously formed separately from the formation of the polyurethane polymer. It is anticipated that the rigid polymer will be added to the polyurethane-forming composition prior to the reaction thereof to form the polyurethane. Preferably, the rigid polymer will be dispersed in the active hydrogen-containing composition which is employed to make the polyurethane. In such case, the rigid polymer may be polymerized in situ in the active hydrogen-containing composition, or component thereof, or can be separately formed and added to the active hydrogen-containing composition.

Any polymerization technique which provides polymer particles having the required aspect ratio is suitable. Especially suitable is a solution polymerization technique wherein the monomer(s) or polymer precursor(s) are polymerized in a solvent in which the monomers are soluble, and in which the polymer is soluble at least until it has sufficient molecular weight to achieve the required aspect ratio. Such solvent may be an active hydrogen containing compound or mixture thereof, or other, non-isocyanate reactive compound or mixture. For the preferred rigid polyurea polymer, a suitable solvent is dimethylformamide, or a solution thereof containing about 0.5 to about 20%, preferably about 1 to about 5%, by weight of an inorganic salt such as lithium chloride.

Often, the solubility of the rigid polymer in the solvent is a means of controlling molecular weight. Typically, the polymerization reaction proceeds until the polymer reaches a molecular weight at which it is no longer soluble and precipitates. By the control of temperature, or the use of binary and/or ternary solvent systems, it is often possible to adjust the solvent composition such that the solubility of the polymer therein is such that it precipitates at a desired molecular weight. Other known techniques for controlling polymer molecular weight may similarly be employed in the preparation of the rigid polymer as desired.

The rigid polymer is dispersed into the polyurethane-forming components prior to the reaction thereof to form a polyurethane. When the polymer is formed in situ in an active hydrogen-containing compound, no further dispersion is required. However, when the rigid polymer is formed separately, it is dispersed into the polyurethane-forming components in a manner by which the rigid polymer is substantially uniformly distributed. This is readily accomplished by, for example, mixing a solution of the rigid polymer in a suitable solvent with the active hydrogen-containing composition, or component thereof, which may itself be dissolved in the same or a different solvent. After mixing, the solvent is advantageously removed such as by vacuum stripping. Alternatively, the rigid polymer may be added neat or as a melt to the active hydrogen-containing composition. However, this method is less preferred due to the high melting points exhibited by many of the rigid polymers.

Sufficient of the rigid polymer is employed to measurably increase the tensile strength and/or elongation of the polyurethane polymer. This amount will vary somewhat according to the molecular weight and stiffness of the rigid polymer and the composition of the polyurethane. However, when the rigid polymer has a molecular weight greater than about 3000, about 0.5-30, preferably about 1-25, more preferably about 1-20 parts by weight of rigid polymer per 100 parts polyurethane are suitable. With low molecular weight (less than about 3000 molecular weight) rigid polymers, about 5-30, preferably 5-20 parts by weight rigid polymer provide improved properties. The polyurethane polymer may be cellular, microcellular or non-cellular. In particular, this invention is useful for making flexible polyurethane foams, rigid polyurethane foams, microcellular or noncellular polyurethane elastomers, structural polyurethane polymers, polyurethane films and coatings, and the like. For the purposes of this invention, the term "polyurethane" refers not only to polymers containing a —NCOO— linkage, but also to other polymers which are based on polyisocyanates, including polyureas, polyurethaneureas, polyisocyanurates, polyurethane-modified polyisocyanurates, and the like. All of these polymers are characterized as being the reaction product of a polyisocyanate with an active hydrogen-containing composition.

An active hydrogen-containing composition is a composition comprising at least one compound having a plurality of moieties which contain at least one hydrogen atom which is reactive with an isocyanate group. Such moieties include hydroxyls, primary and secondary amines, carboxylic acids, mercaptans and the like. Compounds having hydroxyl and primary or secondary amine groups are preferred. Suitable such compounds are described, for example, in U.S. Pat. No. 4,394,491, incorporated herein by reference.

The molecular weight and functionality of the active hydrogen-containing compound depends on the desired physical characteristics of the polyurethane. For elastomeric applications, cellular and noncellular, a relatively high equivalent weight, e.g. 400-10,000, low functionality (i.e. 2-4 active hydrogen containing groups per molecule) is advantageously used. Often, such elastomers are prepared using a mixture of high equivalent weight compounds and low equivalent weight compounds (crosslinkers or chain extenders). For preparing rigid polyurethane foams, a lower equivalent weight (31-400), high functionality (3-16 functional) active hydrogen containing compound or mixture thereof is generally employed. The selection of suitable active hydrogen containing compounds for prepared a polyurethane of desired characteristics is well known to those skilled in the relevant art.

Particularly suitable active hydrogen containing compounds for the preparation of flexible polyurethane foams are polyester polyols and polyether polyols which contain about 2-3 hydroxyl groups per molecule and have an equivalent weight from about 500-3000. Especially preferred are polyether polyols which are prepared by sequentially reacting propylene oxide and ethylene oxide to a di— or trihydric initiator to form a primary hydroxyl-terminated polyether of about 1000-2000 equivalent weight. Polymer polyols prepared by the in situ polymerization of vinyl monomers, polyurea or polyurethaneurea forming components in said especially preferred polyols are also particularly suitable. In making flexible polyurethane foams, it is common practice to employ a minor amount of a crosslinker such as diethanolamine in the active hydrogen-containing composition.

In making noncellular or microcellular polyurethane elastomers, particularly suitable active hydrogen containing compounds are polyester polyols and polyether polyols which contain about 2-3 hydroxyl groups per molecule and have an equivalent weight from above 500-3000. Especially preferred are polyether polyols which are prepared by sequentially reacting propylene oxide and ethylene oxide to a di— or trihydric initiator to form a primary hydroxyl-terminated polyether of about 1000-2000 equivalent weight. Such relatively high equivalent weight polyol is normally used in conjunction with a difunctional, relatively low equivalent weight active hydrogen containing compound such as are described in U.S. Pat. No. 4,269,945. It is often desirable to prereact all or part of either the high equivalent weight compound or the low equivalent weight polyol with a polyisocyanate to form an isocyanate terminated prepolymer or quasi-prepolymer prior to the reaction of the prepolymer with the remainder of the active hydrogen-containing materials. Either conventional casting or reaction injection molding (RIM) techniques may by used to mold the elastomer. Such RIM techniques are described, for example, in Sweeney, F. M., *Introduction to Reaction Injection Molding*, Technomics, Inc., 1979, and in U.S. Pat. Nos. 4,269,945, 4,297,444, 4,530,444, and 4,530,941, all incorporated by reference.

The polyisocyanate employed to make the polyurethane is an agent compound having averages of at least two isocyanate groups per molecule. The isocyanate groups may be bonded to aromatic or aliphatic carbon atoms. Such polyisocyanates are described, for example, in U.S. Pat. Nos. 4,065,410, 3,401,180, 3,454,606, 3,152,162, 3,492,330, 3,001,973, 3,594,164 and 3,164,605, all incorporated by reference.

Aromatic polyisocyanates which are particularly useful include 2,4- and/or 2,6-toluene diisocyanate, diphenylmethanediisocyanate, p-phenylene diisocyanate, polymethylenepolyphenylpolyisocyanates, mixtures thereof and the like. Also useful are polymeric derivatives of diphenylmethanediisocyanate as well as prepolymers or quasi-prepolymers thereof.

Particularly useful aliphatic polyisocyanates include, for example, the hydrogenated derivatives of the foregoing aromatic polyisocyanates, as well as hexamethylene diisocyanate, isophoronediisocyanate, 1,4-cyclohexane diisocyanate and the like.

In addition, prepolymers and quasi-prepolymers of the foregoing polyisocyanates having an —NCO content of about 0.5 to about 30% by weight are useful herein.

The polyisocyanate is advantageously present in a amount sufficient to provide in the reaction mixture from about 70 to about 500, preferably about 80 to about 150, and more preferably about 95 to about 120 isocyanate groups per 100 active hydrogen containing groups. Higher amounts of the polyisocyanate can be used when the formation of an isocyanurate-containing polymer is desired.

In addition to the polyisocyanate and active hydrogen-containing compounds, various other additives which are useful in the preparation of polyurethane polymers may be used herein. Such additives include catalysts, blowing agents, surfactants, fillers, pigments, antioxidants, internal mold release agents and the like.

Suitable blowing agents for preparing cellular polyurethanes include water, low boiling halogenated alkanes such as methylene chloride, monochlorodifluoromethane, dichlorodifluoromethane, dichloromonofluoromethane and the like, the so-called "azo" blowing agents, finely divided solids, and the like as well as other materials which generate a gas under the conditions of the foaming reaction. Water, the halogenated methanes or mixtures thereof are preferred. Water is advantageously employed in an amount from about 0.5 to about 10, preferably about 1 to about 5 parts per 100 parts by weight of the active hydrogen containing compounds.

The halogenated alkanes are advantageously used in amounts from about 5 to about 75 parts per 100 parts of active hydrogen containing compounds.

Surfactants are commonly used in the production of cellular polyurethanes, in an amount sufficient to stabilize the forming cells against collapse until the foam is cured. Silicone surfactants are preferred.

Catalysts for preparing polyurethanes include organometallic catalysts and tertiary amines compounds. Of the organometallic catalysts, organotin catalysts are generally preferred. Suitable catalysts are described, for example, in U.S. Pat. No. 4,495,081, incorporated herein by reference. When using such catalysts, an amount sufficient to increase the rate of the reaction of the polyisocyanate and active hydrogen-containing compounds is employed. Typically, about 0.001 to about 0.5 parts of an organometallic catalyst is used per 100 parts of active hydrogen-containing compound. Tertiary amine containing compounds are advantageously used in amounts ranging from about 0.1 to about 3 parts per 100 parts of active hydrogen containing compounds.

Suitable fillers include barium sulfate, titanium dioxide, carbon black, iron oxide, calcium carbonate, clays such as kaolin and wollastinite, fibers such as glass, polyester and polyamide fibers, and the like. However, due to the reinforcing behavior of the rigid polymer, the need to employ fillers for the purpose of reinforcement is eliminated or significantly reduced.

Suitable internal mold release agents include those described in U.S. Pat. No. 4,585,803, incorporated herein by reference, as well as combinations of metal carboxylates, particularly zinc carboxylates, with primary or secondary amine-containing compounds, especially amine-terminated polyethers, optionally in the presence of a free acid.

The polyurethane polymer of this invention is useful as cushioning for furniture, bedding, automobile seating and the like; as a coating or sealant; as automobile parts such as bumpers, door panels, fascia and the like, as well as for other uses.

The following examples are provided to illustrate the invention, but are not intended to limit the scope thereof. All parts and percentages are by weight unless otherwise indicated.

EXAMPLE 1

A. Preparation of Rigid Rod Polymer

In a suitable flask are dissolved 19.9 grams of methylene dianiline (MDA) and 25 grams diphenylmethanediisocyanate (MDI) in 750 grams of dimethylformamide (DMF). The solution is placed under a nitrogen atmosphere and stirred for 30 minutes at room temperature. At this time, an off-white polymer precipitates out of the solution. Seven grams of lithium chloride are added to the solution to redissolve the polymer. After sitting for one hour, a few drops of methyl alcohol are added to react with any terminal —NCO groups. Infrared analysis indicates that no measurable isocyanate groups remain. Differential scanning calorimetry (DSC) indicates that the polymer has the average structure

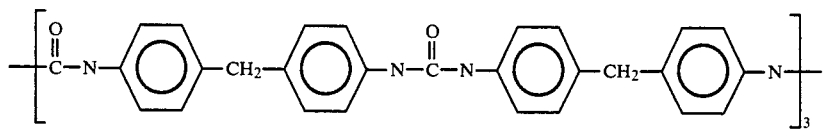

B. Preparation of Polyurethane Elastomers

Into 675 grams of DMF are placed 25 grams of a 2000 molecular weight difunctional poly(propylene oxide) and 23.6 grams of a 143 equivalent weight "liquid" diphenylmethanediisocyanate. This mixture is heated at 70° C. with stirring for two hours under a nitrogen atmosphere. Then, 5 grams of 1,4-butanediol are added and allowed to react for an additional two hours at 70° C.

C. Reinforced Polymer Film Preparation

A series of polyurethane films (Sample Nos. 1–5 and Comparative Sample No. A) are prepared by blending portions of the polyurethane elastomer solution and the rigid rod polymer solution to yield polyurethane solutions containing 0, 3, 6, 10, 15, 20 and 30% (by weight of the polyurethane) of rigid rod polymer. Comparative Sample No. A contains none of the rigid rod polymer and comparative Sample No. B contains 3% of the rigid rod polymer. In each instance, a 20 gram portion of the mixture is poured into a polyethylene container and the solvents are evaporated overnight at 50° C. The residue in each instance is a thin film which is easily removed from the container. The films are tested for tensile strength and elongation according to ASTM D-412. The results are as reported in Table 1 following.

TABLE 1

| Sample No. | % Rigid Polymer | Tensile Strength, psi | Elongation % |
|---|---|---|---|
| A* | 0 | 1091 | 276 |
| B* | 3 | 556 | 181 |
| 1 | 6 | 1500 | 86 |
| 2 | 10 | 2750 | 305 |
| 3 | 15 | 3333 | 178 |
| 4 | 20 | 2200 | 131 |
| 5 | 30 | 1167 | 55 |

*Not an example of this invention

As can be seen from the data in Table 1, the inclusion of about 6–30 percent of the low molecular weight rigid rod polymer causes substantial increases in tensile strength and, in in some cases, an improvement in elongation as well. This is particularly seen when about 6–20 percent rigid polymer is present. In Sample No. 3, tensile strength is tripled with only a small loss in elongation, and in Sample No 2, tensile strength is increased over 250% and elongation is increased. This behavior is contrary to the normal activity of reinforcing agents, which tend to greatly decrease elongation while increasing tensile strength. In Sample B, the inclusion of 3% of the rigid rod polymer decreases both tensile strength and elongation. This is believed due to the relatively low molecular weight of the rigid rod polymer. At this low molecular weight and low level of use, the rigid rod polymer is believed to plasticize rather than reinforce the polymer.

EXAMPLE 2

A. Preparation of Polyurethane Elastomer

Into 700 grams are dissolved 25 grams of the polyol described in Part B of Example 1, 23.6 grams of a 143 equivalent weight liquid MDI and 5 grams of 1,4-butanediol. This solution is heated at 60° C. under a nitrogen pad for 6 hours.

B. Preparation of Reinforced Polyurethane Films

A series of polyurethane films (Comparative Sample No. C and Sample Nos. 6–11) are prepared by blending portions of the polyurethane elastomer solution described in Part A of this example with portions of the rigid rod polymer solution described in Example 1 to yield polyurethane solutions containing 0, 3, 6, 10, 15, 20 and 30% rigid rod polymer (based on weight of polyurethane). Films are cast by placing small quantities of the solutions in Mylar boats, heating to 50° C. overnight and then heating at 100° C. for 3 hours. The properties of these films are tested as described in Example 1, with results as reported in Table 2.

TABLE 2

| Sample No. | % Rigid Polymer | Tensile Strength, psi | Elongation % |
|---|---|---|---|
| C* | 0 | 1732 | 127 |
| 6 | 3 | 1606 | 236 |
| 7 | 6 | 2794 | 162 |
| 8 | 10 | 3075 | 263 |
| 9 | 15 | 2121 | 174 |
| 10 | 20 | 2408 | 142 |
| 11 | 30 | 1041 | 73 |

*Not an example of this invention

In this polyurethane, addition of even 3% rigid rod polymer almost doubles elongation at substantially the same tensile strength. At 6–20% levels of rigid rod polymer, very substantial increases in both tensile strength and elongation are seen.

EXAMPLE 3

A. Preparation of Rigid Rod Polymer

An MDI-MDA copolymer is prepared as described in Example 1, except this time the polymerization solvent contains 7 grams lithium chloride. No precipitation occurs after one hour of polymerization at which time a small amount of methyl alcohol is added to terminated the reaction. The resulting solution is significantly more viscous than that described in Example 1, indicating that the rigid polymer has a substantially higher molecular weight.

B. Preparation of Polyurethane Elastomer

A polymer solution is prepared as described in Example 2-A, except that pure MDI is used, and the reaction is conducted for 8 hours.

C. Preparation of Reinforced Polyurethane Films

Polyurethane films (Sample Nos. 12–15 and comparative Sample No. D) are prepared as described in Example 1-C, except that a Mylar boat is used to cast the films. Films having 1, 3, 6, 10, and 0% rigid rod reinforcement (based on weight of polyurethane) are prepared which are tested as described in Example 1. Tensile molulus and the thermal expansion in inches which results from heating the films from 50° C. to 150° C. are also evaluated. Results are as reported in Table 3.

TABLE 3

| Sample No. | C* | 12 | 13 | 14 | 15 |
|---|---|---|---|---|---|
| % Rigid Rod Polymer | 0 | 1 | 3 | 6 | 10 |
| Tensile Str., psi | 520 | 1715 | 1810 | 1914 | 942 |
| Elongation, % | 133 | 310 | 300 | 279 | 30 |
| Tensile Mod., psi | 1667 | 6322 | 8089 | 1047 | 6977 |
| Extension (50–150 C., in.) | .0039 | .0138 | .0052 | .0041 | .0016 |

In this example, use of a higher molecular weight rigid rod polymer provides over 300% increase in tensile strength and over 250% increase in elongation at levels as low as 1%. Tensile moduli are also increased in all cases except Sample No. 14. Microscopic analysis of Sample Nos. 12–15 show the presence of microscopically dispersed polyurea particles measuring about 1 micron in length and 0.1 micron in diameter.

COMPARATIVE EXAMPLE

A polyurethane solution is prepared as described in Example 3. To separate portions of this solution are added sufficient amounts of 1/16" milled glass fibers to yield polyurethanes containing 0, 3, 6, 10, 15, and 20% glass (based on weight of polyurethane). Films are made from these solutions as described in Example 2 and tested as described in Example 1, with results as reported in Table 4.

TABLE 4

| % Glass | Tensile Strength, psi | Elongation % |
|---|---|---|
| 0 | 1220 | 276 |
| 3 | 1403 | 233 |
| 6 | 1040 | 107 |
| 10 | 1092 | 80 |
| 15 | 1303 | 33 |
| 20 | 1618 | 30 |

These results show the typical effect of using macroscopic inorganic fillers to increase tensile strength. Although tensile strength is in some cases increased, the use of the glass fibers uniformly causes a substantial loss in elongation, which increases with increasing level of filler. This result is in direct contrast with the present invention, in which elongation is substantially maintained, and often greatly increased with the use of rigid rod polymers as reinforcing agents.

What is claimed is:

1. A polyurethane polymer having dispersed therein elongated particles of a high-melting, rigid polymer, said particles having an average length of less than about 10 microns, in an amount sufficient to measurably increase the tensile strength and/or elongation of the polyurethane relative to a like polyurethane which is prepared in the absence of said elongated particles.

2. The polyurethane polymer of claim 1 wherein said rigid polymer has an aspect ratio of at least about 6.4.

3. The polyurethane polymer of claim 2 which contains about 1 to about 20 parts of rigid polymer per part of polyurethane polymer.

4. The polyurethane polymer of claim 3 wherein said rigid polymer comprises a polymer of an aromatic diamine and an aromatic diisocyanate.

5. The polyurethane polymer of claim 4 wherein said aromatic diamine comprises methylene dianiline and said aromatic diisocyanate comprises diphenylmethanediisocyanate.

6. The polyurethane polymer of claim 3 which is noncellular or microcellular.

7. The polyurethane polymer of claim 3 which is cellular.

8. An active hydrogen-containing composition comprising at least one active hydrogen-containing compound having dispersed therein elongated particles of a high-melting polymer, which particles have an average length of less than about 10 microns, in an amount which provides reinforcement to a polyurethane polymer prepared by reacting said active hydrogen-containing composition with a polyisocyanate.

9. The composition of claim 8 wherein said rigid polymer has an aspect ratio of at least about 6.4.

10. The composition of claim 9 which contains from about 1 to about 20 parts of rigid polymer per 100 parts of active hydrogen containing compound(s).

11. The composition of claim 10 wherein said rigid polymer is a polymer of an aromatic diisocyanate and an aromatic diamine.

12. The composition of claim 11 wherein said aromatic diisocyanate comprises diphenylmethanediisocyanate and said aromatic diamine comprises methylene dianiline.

13. The composition of claim 10 wherein said active hydrogen containing compound comprises a polyether polyol having an equivalent weight of about 500 to about 8000 and a functionality of about 2 to about 3.

14. The composition of claim 13 wherein said active hydrogen containing compound further comprises a relatively low equivalent weight diol or diamine.

15. The composition of claim 13 further comprising a blowing agent, a catalyst for the reaction of an active hydrogen containing compound with a polyisocyanate, and a silicone surfactant.

16. The polymer of claim 3 wherein said particles have an average length of less than about 2 microns.

17. The composition of claim 10 wherein said particles have an average length of less than about 2 microns.

* * * * *